United States Patent
Tsai

(10) Patent No.: US 7,525,418 B2
(45) Date of Patent: Apr. 28, 2009

(54) SEGMENTED BRAKE LIGHT

(76) Inventor: Chou-Pai Tsai, No. 31, Lin 8, Guosing Village, Sanjiepu, Shueishang Hsiang, Chiayi Hsien (TW)

(*) Notice: Subject to any disclaimer, the term of this patent is extended or adjusted under 35 U.S.C. 154(b) by 267 days.

(21) Appl. No.: 11/461,267

(22) Filed: Jul. 31, 2006

(65) Prior Publication Data

US 2008/0024290 A1    Jan. 31, 2008

(51) Int. Cl.
*B60Q 1/44* (2006.01)

(52) U.S. Cl. ............. 340/479; 340/438; 340/453; 340/464; 340/467; 362/499; 362/541

(58) Field of Classification Search ............ 340/438, 340/453, 464, 467, 471, 479, 488, 489; 362/499
See application file for complete search history.

(56) References Cited

U.S. PATENT DOCUMENTS 5,148,147 A    9/1992  Kobres
5,150,098 A    9/1992  Rakow
5,594,415 A    1/1997  Ishikawa et al.
2006/0232396 A1 * 10/2006 Oasem ................ 340/479

FOREIGN PATENT DOCUMENTS

| FR | 2831498 | 5/2003 |
| GB | 2328092 | 2/1992 |
| GB | 2344003 | 5/2000 |
| WO | 0192061 | 12/2001 |

* cited by examiner

*Primary Examiner*—Jeff Hofsass
*Assistant Examiner*—Ojiako Nwugo
(74) *Attorney, Agent, or Firm*—patenttm.us

(57) ABSTRACT

A segmented brake light has a detecting module mounted in a vehicle near a brake pedal, a driving module connected to the detecting module and multiple light modules controlled by the driving module. The detecting module detects the pressures on the brake pedal to output signals to the driving module. The driving module based on the received signals to start the respective one or multiple light modules. Accordingly, other car drivers in the rear of the vehicle can recognize that whether the vehicle is going to brake.

18 Claims, 13 Drawing Sheets

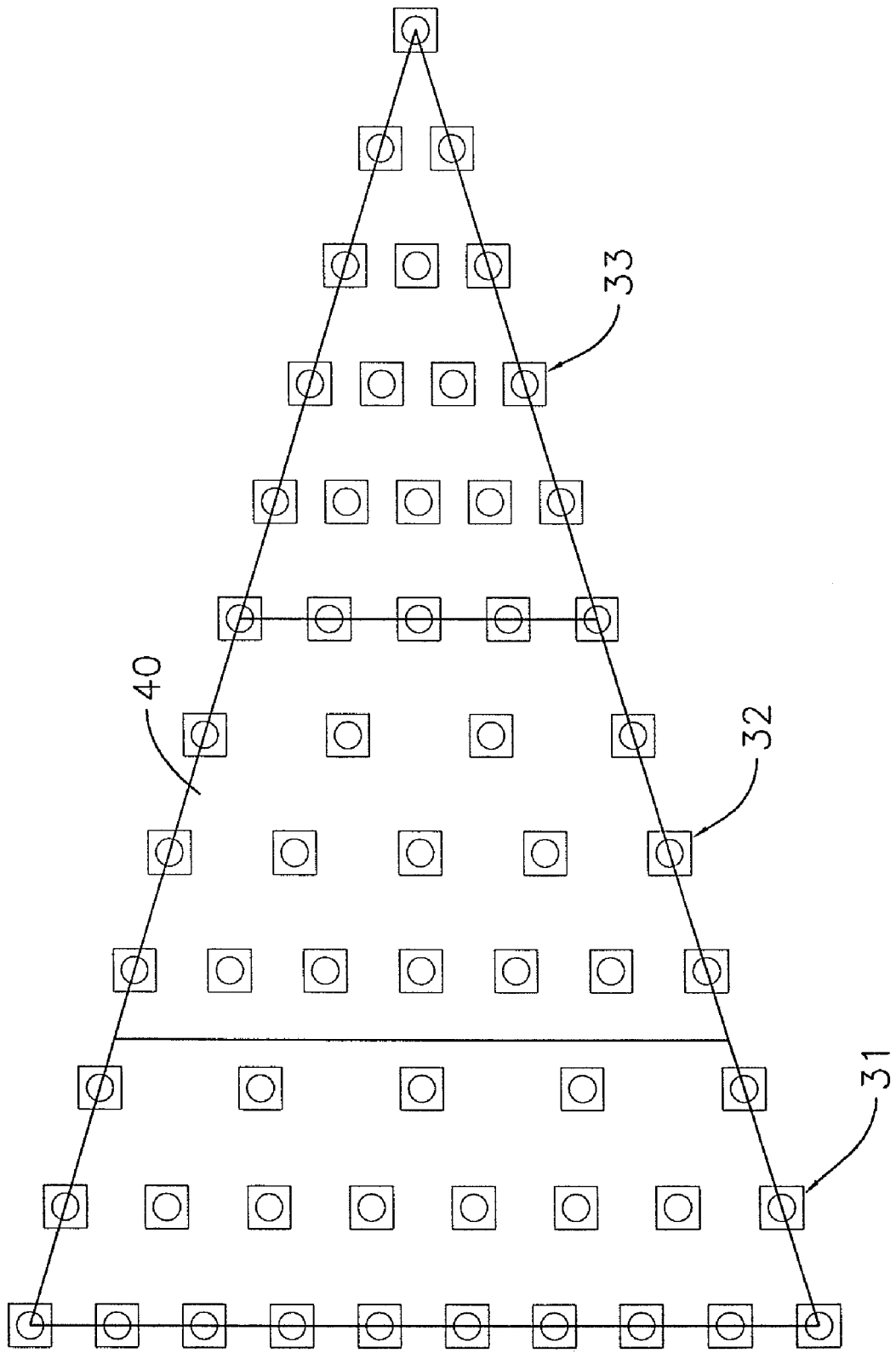

SEGMENTED BRAKE LIGHT

BACKGROUND OF THE INVENTION

1. Field of the Invention

The present invention relates to a segmented brake light, and more particularly to a brake light composed of multiple light modules that are selectively and progressively activated according to different pressure a driver stepped on the brake pedal.

2. Description of Related Art

A top-installed rear brake light near the rear windshield in a vehicle is usually started when the driver is stepping on a brake pedal to warn other people behind the vehicle to avoid any collision.

How the top-installed rear brake light works is often determined by the sensitivity of the brake light and a driver's behaviors. A high sensitivity light can be easily activated with a small pressure when the driver slightly steps on the brake pedal. However, the driver may just move the feet to the brake pedal as a preparatory action for braking, not mean to brake the car. Comparing to the high sensitive operations, a low sensitively brake light requires a deep stepping or high pressure on the brake pedal. For other drivers behind the car, they may have no sufficient time in emergency brakes. The complete turn-off and turn-on operations of a conventional light are unable to provide other drivers with a good pre-warning effect.

However, to produce a top-installed rear brake light that can display multiple effects according to different statuses, some complex factors such as modifying original circuits in the vehicle may discourage consumers from equipping the vehicle with such a brake light.

Therefore, the present invention provides a new segmented brake light to overcome the foregoing drawbacks.

SUMMARY OF THE INVENTION

The objective of the present invention is to provide a segmented brake light that can selectively one or multiple light modules according to different pressure a driver steps on a brake pedal thus showing other vehicles with more sufficient braking information without changing original circuits in the vehicle.

The segmented brake light has a detecting module mounted in a vehicle near a brake pedal, a driving module connected to the detecting module and multiple light modules controlled by the driving module. The detecting module detects pressure on a brake pedal of the vehicle to produce a detecting signal based on the detected pressure. The driving module produces a driving signal according to the detecting signal from the detecting module. The multiple light modules connected to the driving module are selectively started according to the driving signal.

Other objectives, advantages and novel features of the invention will become more apparent from the following detailed description when taken in conjunction with the accompanying drawings.

BRIEF DESCRIPTION OF THE DRAWINGS

FIGS. 7 to 9 show different examples of the arrangements of the light modules in accordance with the present invention.

DETAILED DESCRIPTION OF THE PREFERRED EMBODIMENT

Figure 1:
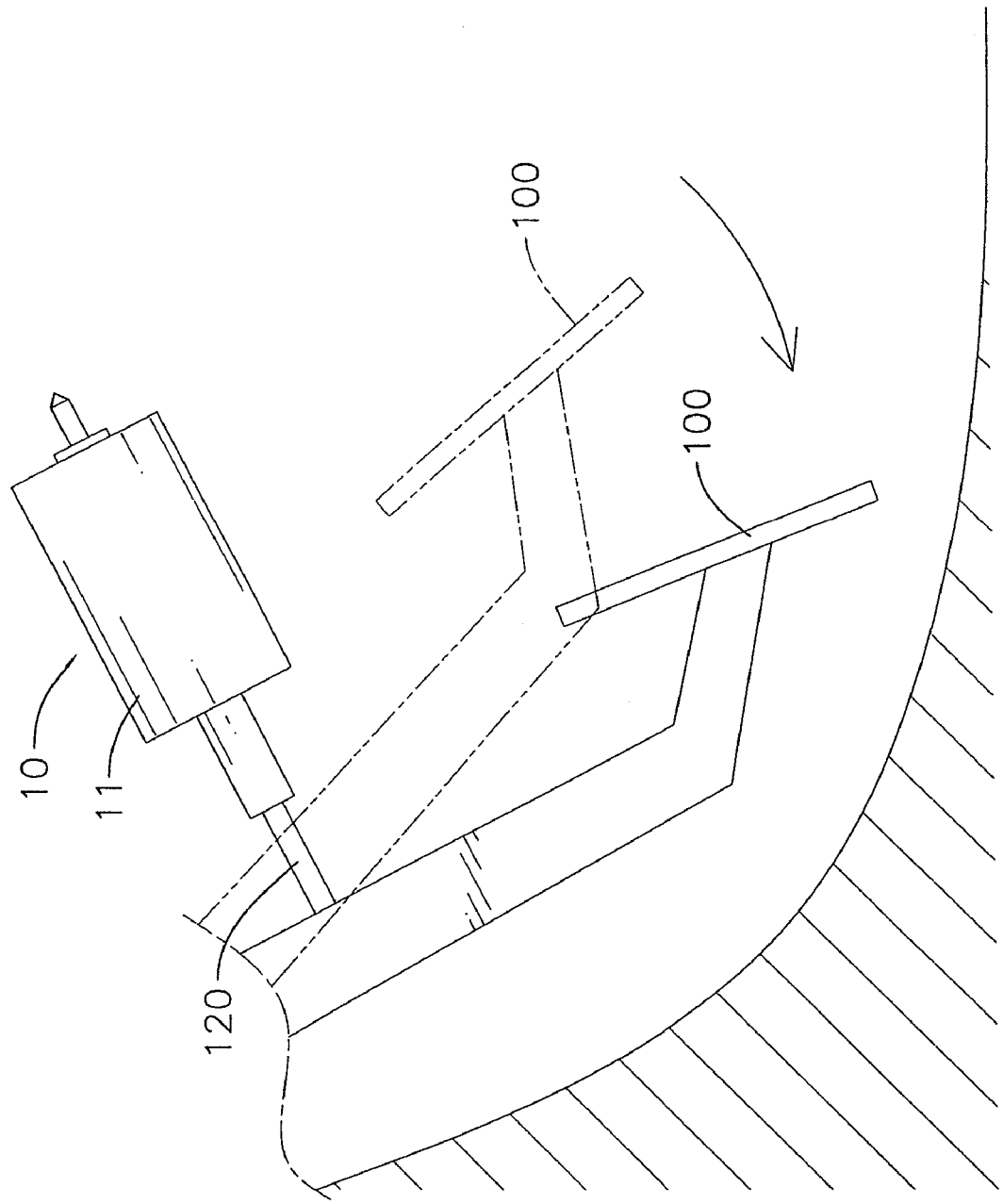
FIG. 1 is a schematic of a detecting module in accordance with the present invention being mounted near a brake pedal.

A segmented brake light in accordance with the present invention is composed of a detecting module, a driving module and multiple light modules. With reference to FIG. 1, the detecting module (10) is mounted at a position near a brake pedal (100) in a vehicle to produce detecting signals in response to different pressures on the brake pedal (100). In this embodiment, the detecting module (10) connects to a power source and produces voltage signals of different levels output to the driving module when the brake light is pressed.

Figure 2:
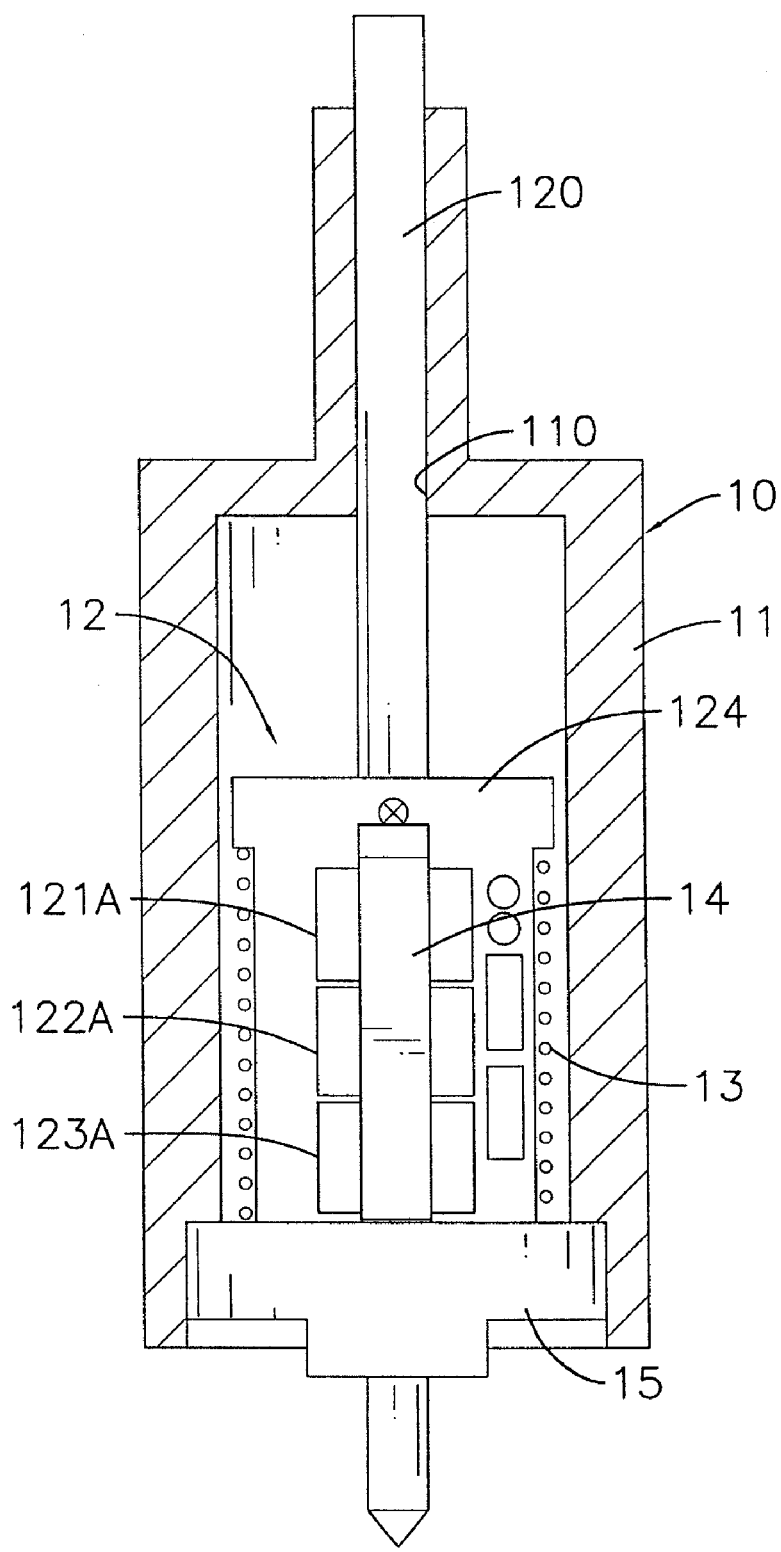
FIG. 2 is a front cross sectional view of the detecting module of FIG. 1 in accordance with the present invention.
Figure 3:
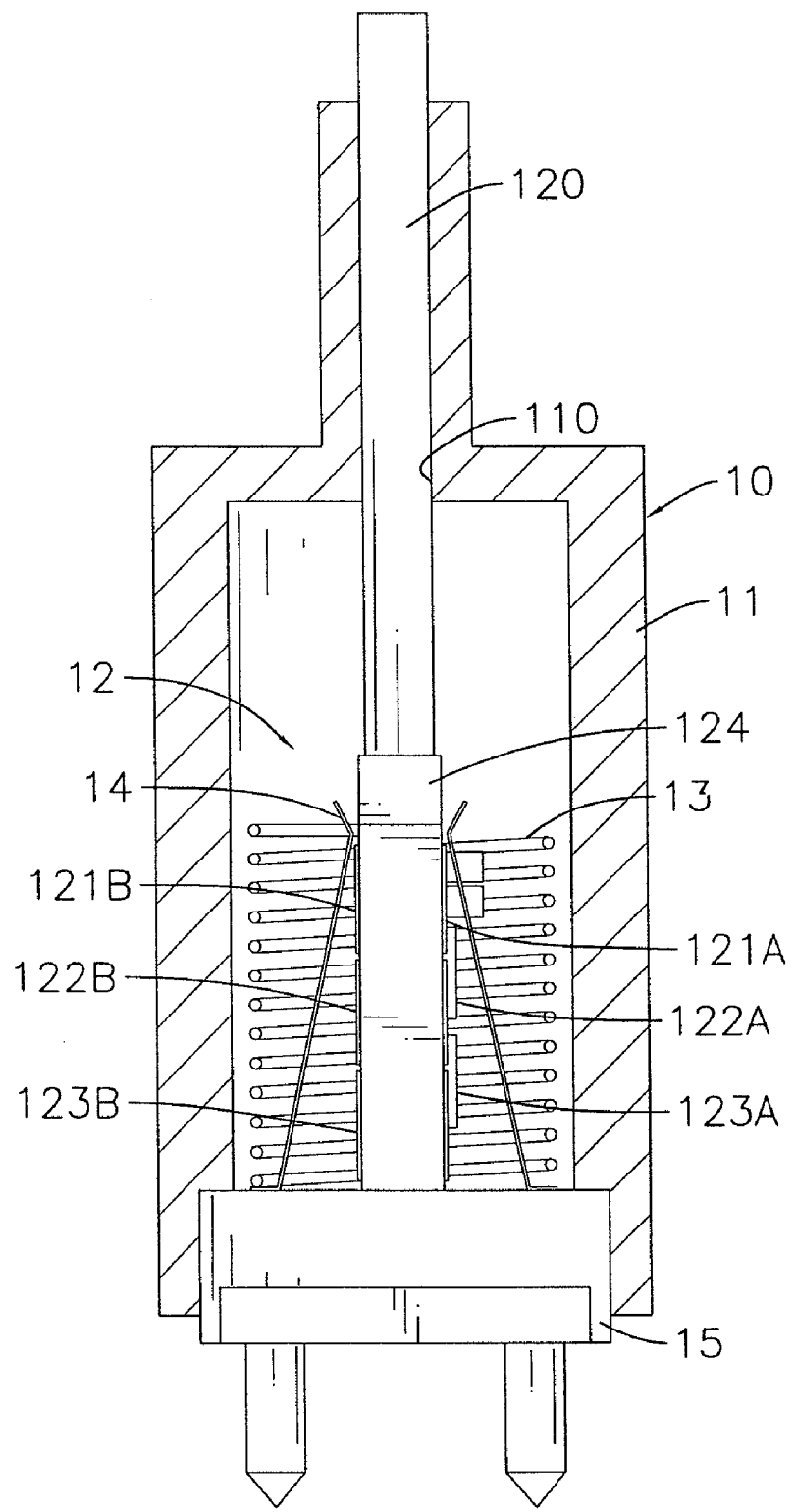
FIG. 3 is a side cross sectional view of the detecting module of FIG. 1 in accordance with the present invention.

With reference to FIGS. 2 and 3, the detecting module (10) comprises a hollow tube (11), an actuator assembly (12) in the tube (11), an elastic element (13), two resilient contacts (14) and a stopper (15).

The hollow tube (11) has an open end and a bottom end with a hole (110) defined through the bottom end, wherein the stopper (15) is filled in the open end.

The actuator assembly (12) in the hollow tube (11) includes a circuit board (124), a shaft (120) with one end jointed to the circuit board (124) and extending through the hole (110) of the hollow tube (11). Another end of the shaft (120) abuts against the brake pedal (100) in such a way that the shaft (120) can extend out of the hollow tube (11) or draw back into the tube (11) depending on whether or not the brake pedal (100) is stepped. The circuit board (124) has multiple pairs of metal contacts (121A, 122A, 123A) (121B, 122B, 123B) formed on its opposite surfaces. These metal contacts (121A, 122A, 123A) (121B, 122B, 123B) are connected to a voltage switching circuit, which will be discussed later.

A spring used as the resilient element (13) in this embodiment is mounted in the hollow tube (11) and abuts between the circuit board (124) and the stopper (15). With the resilient force of the spring, the shaft (120) can be push out of the tube (11).

The two resilient contacts (14) are mounted on the stopper (15) to be contacted with the metal contacts (121A, 122A, 123A) (121B, 122B, 123B) on the circuit board (124).

If the driver does not step on the brake pedal (100), the shaft (120) of the actuator assembly (12) stays in the hollow tube (11) because the brake pedal (100) provides pressure against the shaft (120). Since the two resilient contacts (14) do not touch any metal contacts (121A, 122A, 123A)(121B, 122B, 123B), the detecting module (10) does not output any voltage signal.

Figure 4:
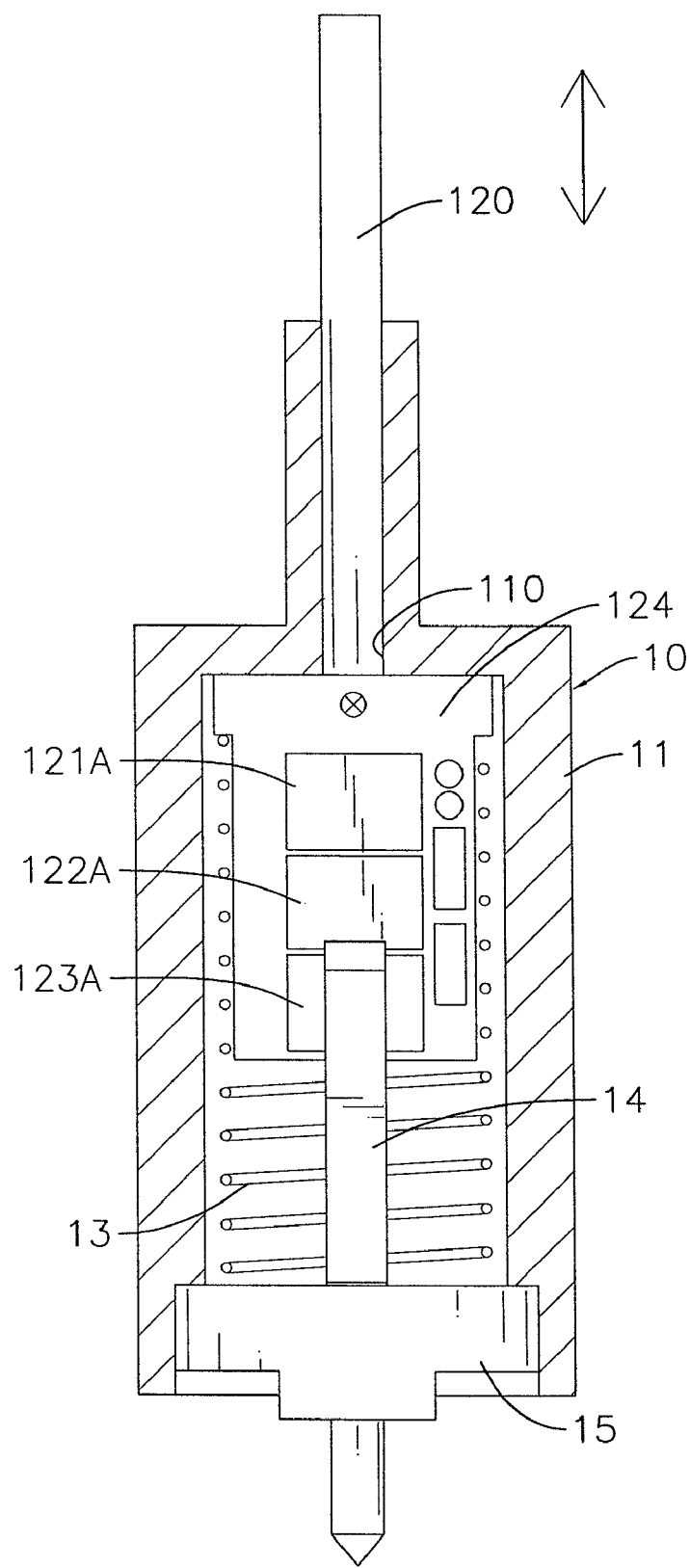
FIG. 4 is an operational cross sectional view of the detecting module.

With reference to FIG. 4, when the brake pedal (100) is pressed, the shaft (12) is gradually drew out from the hollow tube (11) as the stepping force on the brake pedal (100) increases. As the shaft (120) moves, the two resilient contacts (14) sequentially touch the metal contacts (121A, 121B) (122A, 122B) (123A, 123B) to produce and output different voltage signals.

Figure 5:
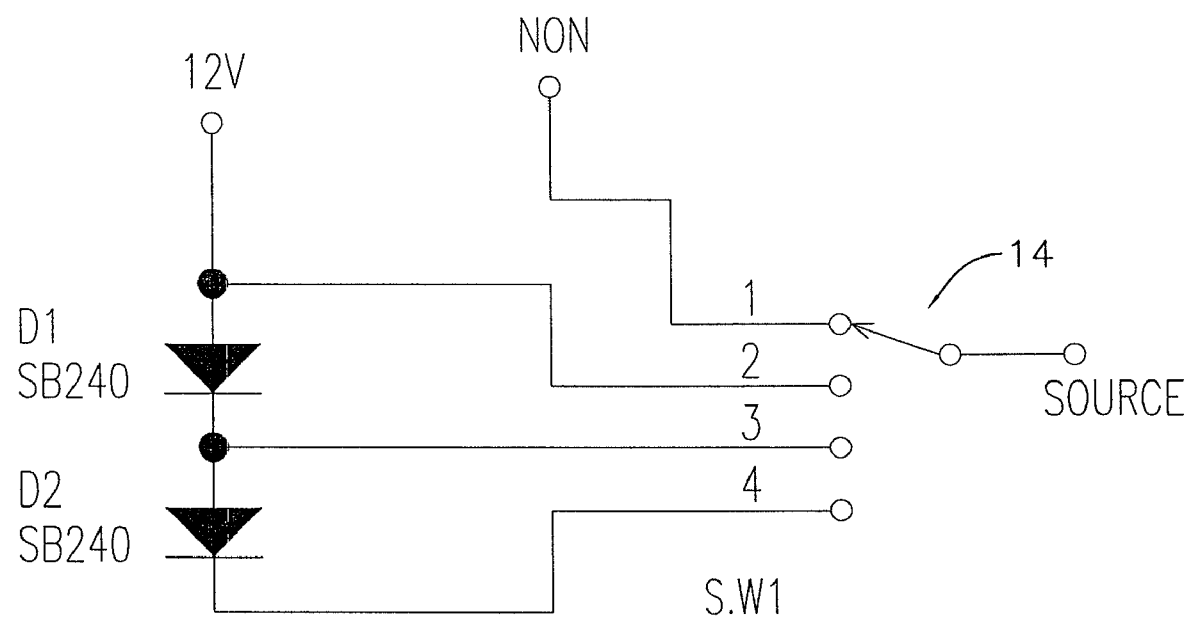
FIG. 5 is a circuit diagram of a voltage switching circuit in accordance with the present invention.
Figure 6A:
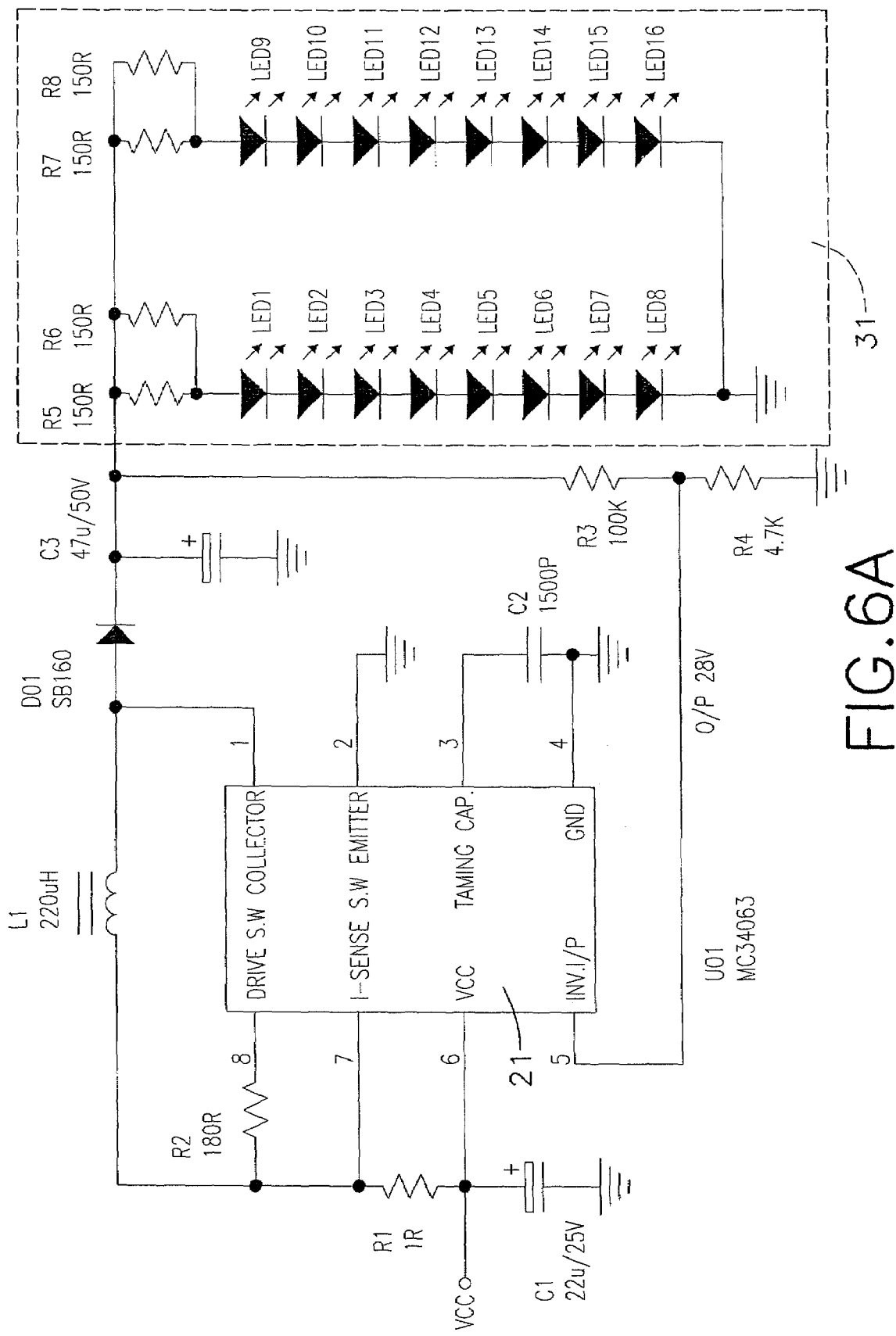
FIG. 6 is a circuit diagram of a driving module in accordance with the present invention.
Figure 6B:
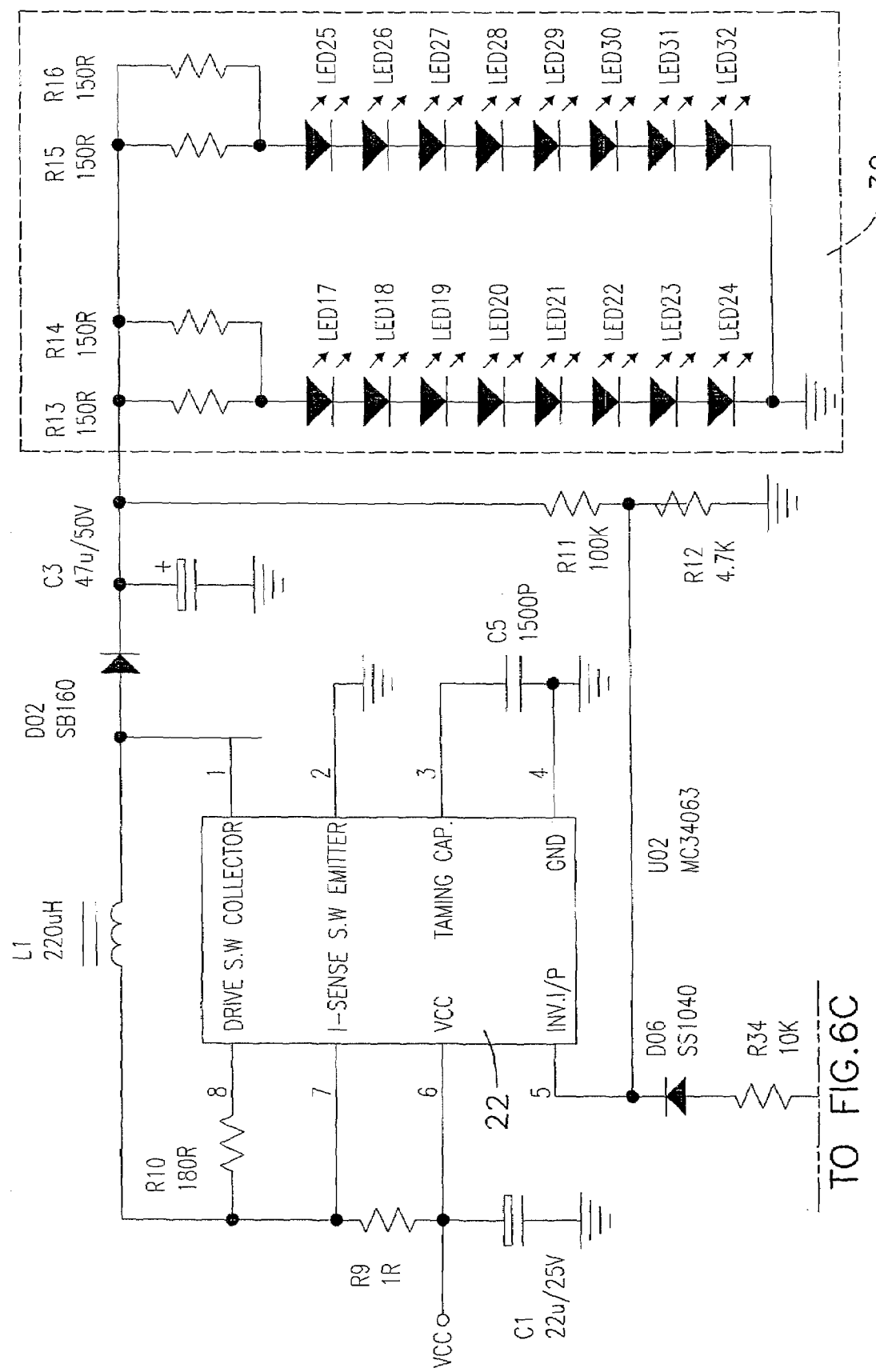
Figure 6C:
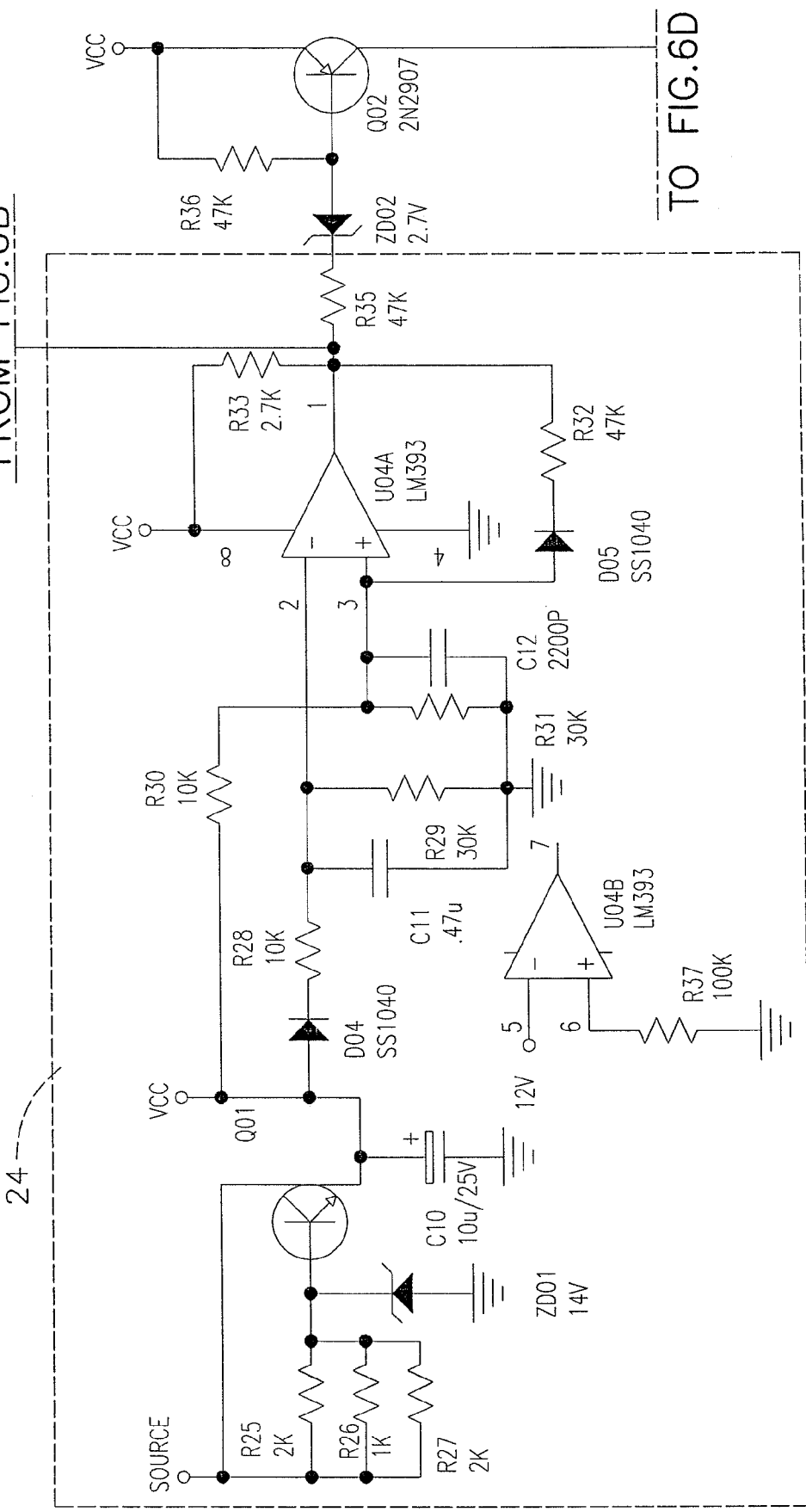
Figure 6D:
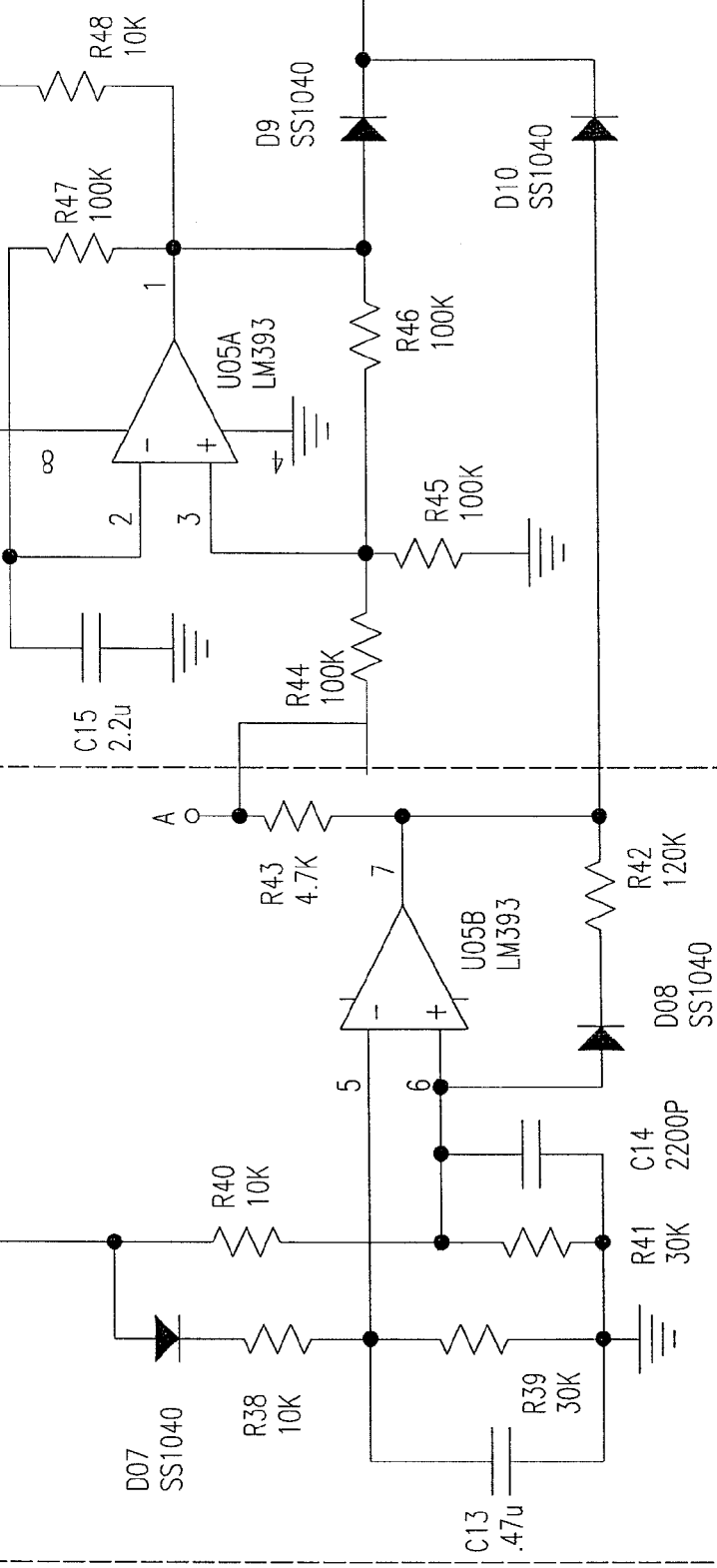
Figure 6E:
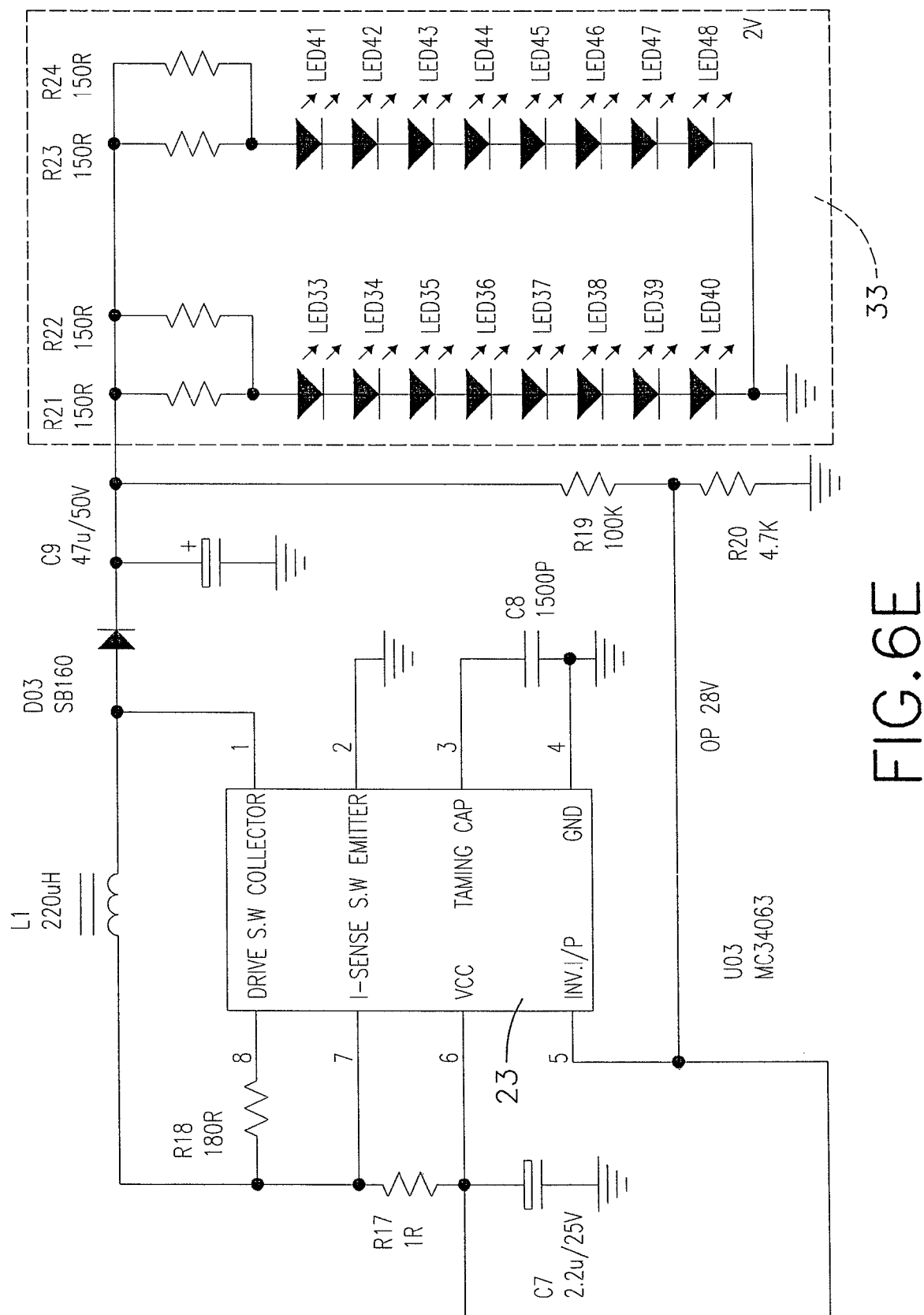

With reference to FIG. 5, how the two resilient contacts (14) touch different pairs of the metal contacts (121A, 121B) (122A, 122B) (123A, 123B) to produce voltage signals of different levels can be represented by the equivalent circuit.

Two diodes (D1, D2) are connected in series to form a three-path voltage switching circuit. A voltage (12V) supplied from a battery in the vehicle is connected to the anode of the first diode (D1) and a second terminal, wherein the second terminal is regarded as the first set of the metal contacts (121A, 121B). The node between the first diode (D1) and the second diode (D2) is used as a third terminal, wherein the third terminal is regarded as the second set of the metal contacts (122A,122B). The cathode of the second diode is used as a fourth terminal that is regarded as the third pair of metal contacts (123A, 123B). When the brake pedal (100) is not stepped, the actuator assembly (12) does not produce any voltage signal so there is no output signal at the output terminal, denoted with "SOURCE".

First, when the brake pedal (100) is slightly stepped, the two resilient contacts (14) respectively touch the first set of metal contacts (121A, 121B), as a result, a voltage signal of 12 volts is directly output from the output terminal (SOURCE).

Secondarily, when the resilient contacts (14) subsequently touch the second set of the metal contacts (122A, 122B), the voltage is output to the brake light through the first diode (D1). The voltage value at the output terminal (SOURCE) is about 11.3 volts.

Finally, if the resilient contacts (14) tough the third set of the metal contacts (123A, 123B), the output voltage through the two diodes (D1, D2) is about 10.6 volts. Based on the different voltage signals, the driving module accordingly activates the respective light modules. The output terminal "SOURCE" is connected to the circuit of FIG. 6.

With reference to FIG. 6, the driving module comprises three voltage boosting circuits (21, 22, 23), a first comparing circuit (24) and a second comparing circuit (25).

Each of the voltage boosting circuit (21, 22, 23) has a power input terminal (pin 6), an output terminal (pin 1) and a trigger terminal (pin 5). The power input terminals connect to the detecting module (10) to receive an operating voltage (VCC) from a Darlington driving circuit in the first comparing circuit (24). The output terminals of the voltage boosting circuit (21, 22, 23) are respectively connected to three light modules (31, 32, 33). Each light module (31, 32, 33) comprises at least one light string formed by multiple light emitting diodes connected in series.

The input terminal of the Darlington driving circuit is connected to the output terminal (SOURCE) of the detecting module (10). The output terminal of the Darlington driving circuit is used as an operating voltage (VCC) output terminal. The first comparing circuit (24) provides an output terminal to connect to the trigger terminal of the second voltage boosting circuit (22). In the first comparing circuit (24), a comparator (U04A) has two input terminals respectively connected to two RC circuits, which are formed by resistors (R29, R31) and capacitors (C11, C12). The capacitance of the two capacitors are different, wherein capacitor (C12) is much smaller than capacitor (C11). The two RC circuits all connect to the operating voltage (VCC). Because the two RC circuits have different RC constants, the charge and discharge speeds of the two RC circuits are not identical. Accordingly, the output voltage level of the comparator (U04A) is determined by the voltage levels at its two input terminals. The output signal of the comparator (U04A) is used to determine whether the voltage boosting circuit (22) should be driven to start the second light module (32).

The second comparing circuit (25) has an input terminal connected to the operating voltage (VCC) output from the detecting module through a PNP transistor (Q02). The base of the transistor (Q02) is connected to the output terminal of the first comparator (U04A), while the collector is connected to the power input terminal of the voltage boosting circuit (23). The emitter of the PNP transistor (Q02) connects to the operating voltage (VCC). The PNP transistor (Q02) determines whether the input terminal of the second comparing circuit (25) and the power input terminal of the voltage boosting circuit (23) should connect to the operating voltage (VCC). The output voltage level of the first comparing circuit (24) determines whether the transistor (Q02) should be turned on. If the output voltage is at a high level, the second voltage boosting circuit (22) will not be triggered, the second light module (32) does not operate and the transistor (Q02) is turned off.

When the first comparing circuit (24) outputs a low voltage level signal, the second voltage boosting circuit (22) is triggered to drive the second light module (32). The transistor (Q02) is turned on and the operating voltage (VCC) is output to the input terminal of the second comparing circuit (25) and the power input terminal of the voltage boosting circuit (23). Depending on the output signal of the second comparing circuit (25), the third voltage boosting circuit (23) determines whether the third light module (33) should be turned on.

The second comparing circuit (25) includes a comparator (U05B) and two RC circuits connected to two input terminals of the comparator (U05B). The two RC circuits are composed of resistors (R39, R41) and capacitors (C13, C14) with different capacitance. The different charge and discharge constants of the two RC circuits determine the output status of the comparator (U05B). The comparator (U05B) further controls whether the third voltage boosting circuit (23) should be driven to turn on the third light module (33). To have distinct lighting effects between the first light module (31) and the second light module (32), an oscillating circuit (26) is connected between the second comparing circuit (25) and the third voltage boosting circuit (23) to control the third light module (33) operated in a flash mode.

When the driver slightly steps on the brake pedal (100), the detecting module (10) generates a first voltage signal of 12 volts as discussed above. The voltage signal of 12 volts is input to the Darling driving circuit from the terminal (SOURCE). The operating voltage (VCC) hereinafter is deemed as the same as the voltage signal at terminal (SOURCE) because the voltage drop of the transistor (Q01) in the Darlington driving circuit can be omitted. The voltage (VCC) is supplied to the first voltage boosting circuit (21) to drive the first light module (31). Because the positive input terminal has a higher input voltage that the negative input terminal, the first comparing circuit (24) output a high-level voltage signal. The second voltage boosting circuit (22) will not be triggered. Since the second and third voltage boosting circuits (22, 23) are not triggered, the second and third light module (32)(33) accordingly will not be turned on.

When the driver presses the brake pedal (100) deeper, the output voltage from the detecting module (10) becomes 11.3 volts. Because the capacitor (C12) has the smaller capacitance than (C11), the voltage level at the positive input terminal of the comparator (U04A) drops quicker than the negative input terminal. Therefore, the comparator (U04A) outputs a low-level voltage signal. The second voltage boosting circuit (22) is triggered to turn on the second light module (32). The transistor (Q02) also conducts to allow the operating voltage (VCC) to be transmitted to the input terminal of the second comparing circuit (25) and the power input terminal of the third voltage boosting circuit (23).

Finally, when the driver further increases the pressure and completely steps on the brake pedal (100), the detecting module (10) outputs a voltage signal of 10.6 volts as discussed above. Similar to the first comparator (U04A), the voltage change at the input terminals of the second comparartor (U05B) results in a low level signal to trigger the third voltage boosting circuit (33) to drive the third light module (33).

Figure 8:
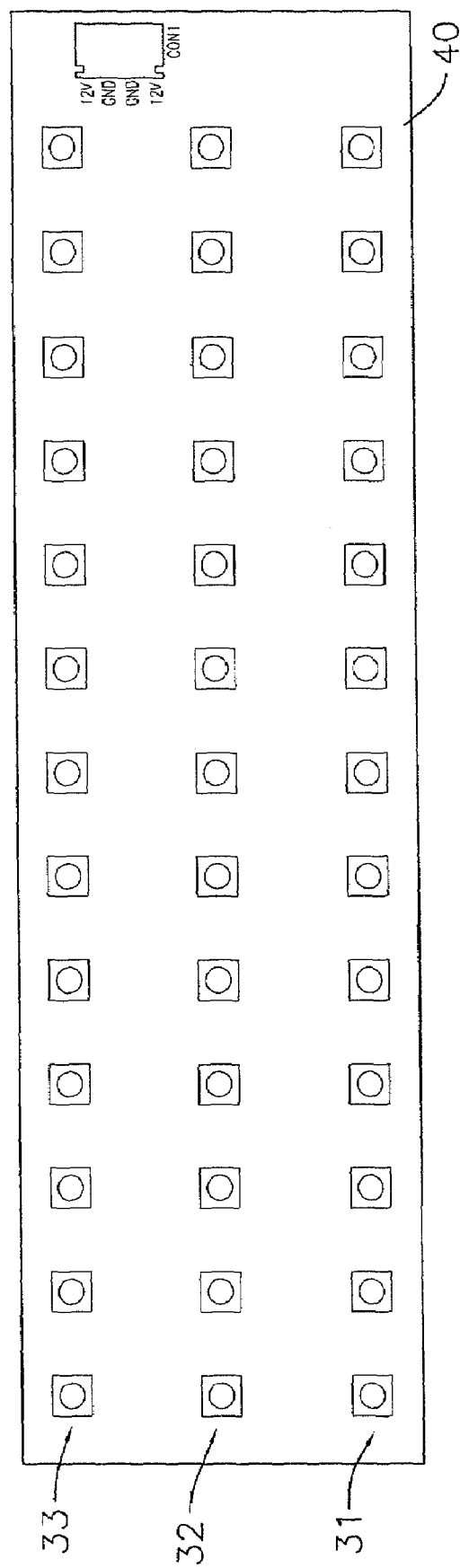
Figure 9:
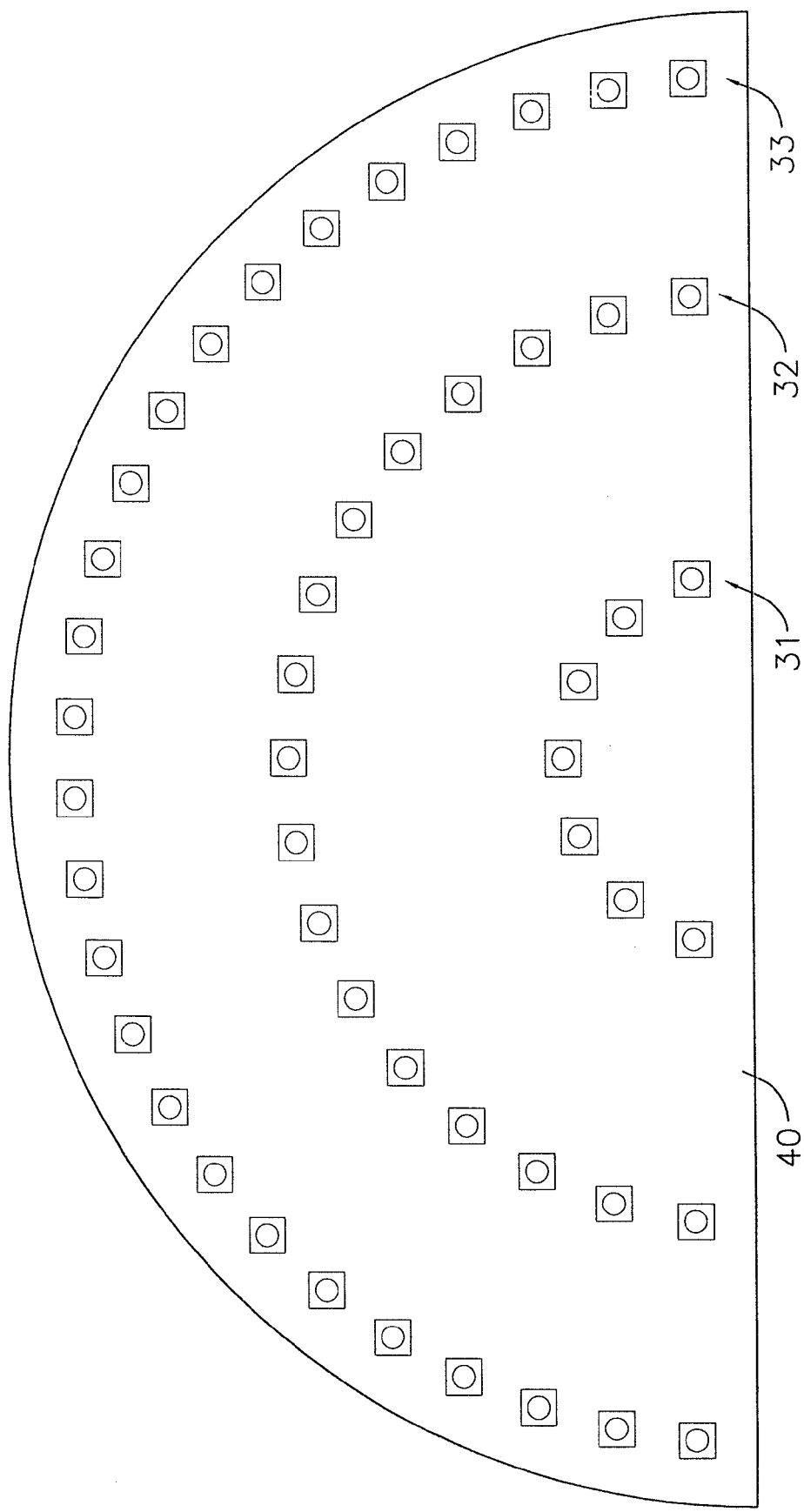

With reference to FIGS. 7 to 9, to produce distinct lighting effects, the three light modules (31, 32, 33) can be different in their colors or arrangements. For example, the light modules (31, 32, 33) can be designed to produce white, yellow and red colors respectively and mounted on a display board (40) to form parallels, a triangular or a fan-shaped configuration. Because the detecting module (10) produces the detected signals, i.e. the voltage signals, based on the voltage variation, original circuits in the vehicle do not need changed.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A segmented brake light for a vehicle, comprising:
   a detecting module detecting pressure on a brake pedal of the vehicle to produce a detecting signal based on the detected pressure;
   a driving module producing a driving signal according to the detecting signal, and comprising:
   multiple voltage boosting circuits, each of the voltage boosting circuit having a power input terminal, an output terminal and a trigger terminal;
   a first comparing circuit having an input terminal connected to the detecting module and an output terminal connecting to the trigger terminal of one of the voltage boosting circuits;
   an electronic switch connected to an operating voltage and the power input terminal of another one of the voltage boosting circuits;
   a second comparing circuit having an input terminal connected to the output terminal of the first comparing circuit through the electronic switch; and
   multiple light modules connected to the output terminals of the voltage boosting circuits of the driving module and being selectively activated according to the driving signal.

2. The segmented brake light as claimed in claim 1, both the first comparing circuit and the second comparing circuit having a comparator with two input terminals that respectively connect to two RC circuits, wherein the RC circuits have different capacitance and further connect to an operating voltage.

3. The segmented brake light as claimed in claim 1, wherein the electronic switch is a PNP transistor with a base connected to the output terminal of the first comparing circuit and a collector connected to the power input terminal of one of the voltage boosting circuits and the input terminal of the second comparing circuit.

4. The segmented brake light as claimed in claim 1, wherein an oscillating circuit is connected between the second comparing circuit and one of the boosting voltage circuits and controls the light module driven by the boosting voltage circuit to flash.

5. The segmented brake light as claimed in claim 1, wherein the input terminal of one of the voltage boosting circuits is directly connected to the output terminal of the detecting module to control a first one of the light modules.

6. The segmented brake light as claimed in claim 1, wherein the detecting module comprises:
   a tube having one end with a stopper;
   an actuator assembly mounted in the tube and comprising a circuit board, a shaft mounted to the circuit board and protruding from the tube to move backward and forward along the tube, and multiple metal contacts formed on the circuit board to connect to a voltage switching circuit;
   a resilient element mounted in the tube to abut against the circuit board to allow the shaft being movable backward and forward along the tube;
   two resilient contacts connected to a driving module and mounted on the stopper to touch the multiple metal contacts on the circuit board.

7. The segmented brake light as claimed in claim 2, wherein the detecting module comprises:
   a tube having one end with a stopper;
   an actuator assembly mounted in the tube and comprising a circuit board, a shaft mounted to the circuit board and protruding from the tube to move backward and forward along the tube, and multiple metal contacts formed on the circuit board to connect to a voltage switching circuit;
   a resilient element mounted in the tube to abut against the circuit board to allow the shaft being movable backward and forward along the tube;
   two resilient contacts connected to a driving module and mounted on the stopper to touch the multiple metal contacts on the circuit board.

8. The segmented brake light as claimed in claim 3, wherein the detecting module comprises:
   a tube having one end with a stopper;
   an actuator assembly mounted in the tube and comprising a circuit board, a shaft mounted to the circuit board and protruding from the tube to move backward and forward along the tube, and multiple metal contacts formed on the circuit board to connect to a voltage switching circuit;
   a resilient element mounted in the tube to abut against the circuit board to allow the shaft being movable backward and forward along the tube;
   two resilient contacts connected to a driving module and mounted on the stopper to touch the multiple metal contacts on the circuit board.

9. The segmented brake light as claimed in claim 4, wherein the detecting module comprises:
   a tube having one end with a stopper;
   an actuator assembly mounted in the tube and comprising a circuit board, a shaft mounted to the circuit board and protruding from the tube to move backward and forward along the tube, and multiple metal contacts formed on the circuit board to connect to a voltage switching circuit;
   a resilient element mounted in the tube to abut against the circuit board to allow the shaft being movable backward and forward along the tube;
   two resilient contacts connected to a driving module and mounted on the stopper to touch the multiple metal contacts on the circuit board.

10. The segmented brake light as claimed in claim 5, wherein the detecting module comprises:
    a tube having one end with a stopper;
    an actuator assembly mounted in the tube and comprising a circuit board, a shaft mounted to the circuit board and protruding from the tube to move backward and forward along the tube, and multiple metal contacts formed on the circuit board to connect to a voltage switching circuit;

a resilient element mounted in the tube to abut against the circuit board to allow the shaft being movable backward and forward along the tube;

two resilient contacts connected to a driving module and mounted on the stopper to touch the multiple metal contacts on the circuit board.

11. The segmented brake light as claimed in claim 8, wherein the voltage switching circuit uses two diodes to form multiple paths that touch the metal contacts on the circuit board.

12. The segmented brake light as claimed in claim 9, wherein the voltage switching circuit uses two diodes to form multiple paths that touch the metal contacts on the circuit board.

13. The segmented brake light as claimed in claim 10, wherein the voltage switching circuit uses two diodes to form multiple paths that touch the metal contacts on the circuit board.

14. The segmented brake light as claimed in claim 3, wherein each of the multiple light modules comprises at least one light string composed of multiple light emitting diodes connected in series.

15. The segmented brake light as claimed in claim 4, wherein each of the multiple light modules comprises at least one light string composed of multiple light emitting diodes connected in series.

16. The segmented brake light as claimed in claim 5, wherein each of the multiple light modules comprises at least one light string composed of multiple light emitting diodes connected in series.

17. The segmented brake light as claimed in claim 1, wherein the multiple light modules are mounted on a display board to form different shapes.

18. The segmented brake light as claimed in claim 16, wherein the multiple light modules are mounted on a display board to form different shapes.

* * * * *